(12) United States Patent
Friedline (10) Patent No.: US 7,765,406 B2
(45) Date of Patent: Jul. 27, 2010

(54) SYSTEM, COMPUTER PROGRAM AND METHOD FOR A CRYTOGRAPHIC SYSTEM USING VOLATILE ALLOCATION OF A SUPERKEY

(76) Inventor: Grant Friedline, 208 Summit La., New Alexandria, PA (US) 15670

( * ) Notice: Subject to any disclaimer, the term of this patent is extended or adjusted under 35 U.S.C. 154(b) by 1118 days.

(21) Appl. No.: 11/397,343

(22) Filed: Apr. 4, 2006

(65) Prior Publication Data

US 2007/0234062 A1    Oct. 4, 2007

(51) Int. Cl.
*H04L 9/00* (2006.01)
(52) U.S. Cl. .................. 713/182; 713/185; 713/150
(58) Field of Classification Search ................. 713/182, 713/185, 150
See application file for complete search history.

(56) References Cited

U.S. PATENT DOCUMENTS

2005/0228721 A1    10/2005    Hofmann

OTHER PUBLICATIONS

Wikipedia Article "Cryptographic Hash Function", printed out in year 2008.*
"Cryptographic Hash-Function Basics: Definitions, Implications, and Separations for Preimage Resistance, Second-Preimage Resistance, and Collision Resistance" by P. Rogaway and T. Shrimpton (Jan. 5, 2004).*
Password Authenticated Key Exchange Protocol with Stronger Security; Ding Xiao-fei; Ma Chuan-gui; Cheng Qing-feng; Education Technology and Computer Science, 2009. ETCS '09. First International Workshop on vol. 2, Mar. 7-8, 2009 pp. 678-681.*
An Efficient Three Party Authenticated Key Exchange for Mobile Communications; Huang, Hui-Feng; Chang, Yi-Jia; Liu, Kuo-Ching; Pervasive Systems, Algorithms, and Networks (ISPAN), 2009 10th International Symposium on Dec. 14-16, 2009 pp. 249-253.*
Number theoretic attacks on secure password schemes; Patel, S.; Security and Privacy, 1997. Proceedings., 1997 IEEE Symposium on May 4-7, 1997 pp. 236-247.*
Wikipedia, Blowfish (cipher), article, Oct. 25, 2006, four (4) pages, USA.
Wikipedia, MD5, article, Oct. 25, 2006, seven (7) pages, USA.
Keyghost Keylogger, KeyGhost the Hardware Keylogger—Interface Security, article, Oct. 25, 2006, six (6) pages, USA.

* cited by examiner

*Primary Examiner*—David Y Jung
(74) *Attorney, Agent, or Firm*—The Webb Law Firm (57) ABSTRACT

A method for protecting data of at least one password-protected account of a user in a system comprises the steps of:
(a) creating, by the user, a password-protected account associated with a user identification and a password on the system;
(b) hashing the password and storing the hashed password in a first password digest in a database;
(c) receiving credential data from a user, including the user identification and password;
(d) requesting, from the database, the first password digest based upon the received credential data;
(e) receiving, into volatile memory, the first password digest from the database in response to the request;
(f) hashing the received password as the credential data and creating a second password digest;
(g) receiving, into volatile memory, the second password digest;
(h) comparing, in volatile memory, the first password digest with the second password digest; and
(i) authenticating the user based upon the comparison.

1 Claim, 11 Drawing Sheets

SYSTEM, COMPUTER PROGRAM AND METHOD FOR A CRYTOGRAPHIC SYSTEM USING VOLATILE ALLOCATION OF A SUPERKEY

BACKGROUND OF THE INVENTION

1. Field of the Invention

The present invention relates to key logging and spyware protection systems. More particularly, the invention relates to an automated system which protects passwords, user identifications, uniform resource locators (URLs), accounts, credit card numbers, social security numbers, personal identification numbers, e-mail addresses, and any other sensitive data.

2. Description of Related Art

Keystroke logging or, as it is often known, key logging is a diagnostic tool used in software development that captures the user's keystrokes. It can be useful to determine sources of error in computer systems. Such legal uses, however, are outweighed by the illegal uses of key logging. Such key logging systems are highly useful for espionage, for instance, providing a means to obtain passwords or encryption keys and, thus, bypassing other security measures.

Keystroke logging can be achieved by both hardware and software means. Commercially available systems include devices which are attached to the keyboard cable and are instantly installable but only visible if the user makes a thorough inspection of his machine. Commercially available systems also include devices which can be installed in keyboards and are invisible but require some basic knowledge of mechanics to install. Writing software for key logging is trivial and can be accomplished by novice computer programmers and, like any computer program, is easy to distribute over the internet in the form of viruses, worms, Trojan horses, etc. It is said that using a non-screen keyboard is a way to combat these types of key logging devices but, as is known in the prior art, it only requires a software key logger to recover these keyboard event messages that are sent by a non-screen keyboard using a mouse click and they can be tracked as easily as a normal keyboard. Every software key logger can log the text typed with both onscreen and traditional keyboards.

In addition to key logging software and hardware, there is another broad category of espionage software known as spyware. Spyware is a category of malicious software designed to intercept or take partial control of a computer's operation without the informed consent of that machine's owner or legitimate user. While the term taken literally suggests software that monitors the user, it has come to refer more broadly to software that subverts the computer's operation for the benefit of a third party.

Spyware differs from viruses and worms in that it does not usually self replicate. Like many recent viruses, however, spyware is designed to exploit infected computers for commercial gain. Typical tactics furthering this goal include delivery of unsolicited pop-up advertisements, theft of personal information such as credit card numbers or financial information, passwords, user accounts, and also monitoring of web browsing activity for malicious purposes or rerouting of HTTP requests. As of 2005, spyware was becoming one of the preeminent security threats for computers running Microsoft Windows operating system or Microsoft browsers or any other known browser.

Historically, spyware has grown as the internet has grown. The first recorded use of spyware occurred somewhere in the year 1994. In early 2000, it was realized that advertising software was being installed on systems and the suspected software was stealing personal information.

Spyware behaviors include reporting on websites the user visits, capturing screen activity, capturing logs, monitoring network connections, and monitoring file transfers.

There are many known infection routes. The spyware does not directly spread in the manner of a computer virus or worm, generally. Typically, an infected system does not attempt to transmit the infection to other computers. Instead, spyware gets on a system through deception of the user or through exploitation of software vulnerabilities.

The most direct route by which spyware can get on a computer involves the user installing it. However, users are unlikely to install software if they know that it will disrupt their working environment and compromise their privacy. So many spyware programs deceive the user either by piggy backing on a piece of desirable software or by tricking the user to do something that installs the software without realizing it. Recently, spyware has come to include rogue anti-spyware programs which masquerade as security software while actually doing damage.

Classically, a Trojan horse by definition smuggles in something dangerous in the guise of something desirable. Some spyware programs get spread in just this manner. The distributor of spyware presents the program as a useful utility for the user, for instance as a utility for free games or a memory accelerator for the computer or as a software agent. Users then download and install the software without immediately suspecting that it can cause harm.

Spyware will also come bundled with shareware or other downloadable software, as well as music CDs. The user downloads a program, for instance a music program or a file trading utility, and installs it. The installer then additionally installs the spyware. Although the desired software itself does no harm in most cases, the bundled software does. In some cases, spyware authors have paid shareware authors to bundle their spyware with the software, as with the well-known Gator.

A third way of distributing spyware involves tricking users by manipulating security features designed to prevent unwarranted installations. The Internet Explorer web browser is designed not to allow sites to initiate an unwanted download. However, links can prove deceptive and a pop-up ad may appear like a standard Windows dial-up box. The box contains a message, such as "Would you like to optimize your internet access?", with links which look like buttons reading "Yes" and "No". No matter which button the user presses, a download starts. The download places the spyware on the user's system and it can be very difficult to remove this software once it is placed on the user's machine.

Some spyware authors infect the system by attacking security holes in the web browser or another software. When the user navigates to a web page controlled by the spyware author, the page contains code that attacks the browser and forces the download and installs the spyware. The author would also have some extensive knowledge of commercially-available anti-virus and firewall software. The spyware author has known browser exploits. An infected computer can rapidly become infected with large numbers of spyware components. Users frequently notice unwanted behavior and degradation of system performance. Spyware infestation can create significant unwanted CPU activity, disk usage, and network traffic. Spyware can also place key logging software on the computer. Stability issues, such as application or system crashes, are also very common. Spyware, which interferes with the networking software, commonly causes difficulty connecting to the internet. Spyware can place programs that can allow remote users to take control and to download information freely, often infecting the machine.

When Microsoft Windows users seek technical support, whether from manufacturers, help desks, internet service providers (ISP), or other sources, typically spyware infection emerges as the most common cause. In many cases, the user has no awareness of spyware and assumes that the system performance, stability, and/or conductivity issues relate to hardware, to Microsoft Windows installation problems, or to a virus. Some owners of badly infected systems resort to buying an entire new computer system because the existing system has become too slow. For badly infected systems, a clean re-install may be required to restore the system to working order, a time-consuming project nonetheless.

Only rarely does a single piece of software render a computer unusable. Rather, a computer rarely has one infection. As the 2004 AOL study noted, if a computer has any spyware at all, it typically has dozens of different pieces installed. The cumulative affect, and the interactions between spyware components, typically cause the symptoms which are reported by users. The symptoms include slow systems because of parasitic processes running on it. Moreover, some types of spyware disable software firewalls and anti-virus software, and reduce browser security settings, opening the system to further opportunistic infections, much like an immune deficiency disease. There are also documented cases where a spyware program disabled other spyware programs created by their competitors. In recent years, a few spyware vendors, notably WhenYou and 180 Solutions, have written programs that have come to be known as affiliate fraud or click fraud. These redirect the payment of affiliate marketing revenues from the legitimate affiliate to the spyware vendor.

Affiliate marketing networks work by tracking users who follow an advertisement from an affiliate and subsequently purchase something from the advertised website. On-line merchants, such as E-bay and Dell, are among the larger companies which use affiliate marketing. In order for affiliate marketing to work, the affiliate places a tag, such as a cookie or a session variable on the user's request, which the merchant associates with the purchases made. The affiliate then receives a small commission. Spyware, which attacks affiliate networks, does so by placing the spyware operator's affiliate tag on the user's activity. Everyone involved is harmed by this type of spyware. The user is harmed by having their choices thwarted. A legitimate affiliate is harmed by having their earned income redirected to the spyware operator. Affiliate marketing networks are harmed by the degradation of their reputation. Vendors are harmed by having to pay out affiliate revenues to an affiliate who did not earn them according to contract.

Another type of spyware is closely associated with identity theft. Spyware closely associated with identity theft is believed to be made by the makers of the common cool web search (CWS) spyware. A common cool web spyware search had used it to transmit chat sessions, user names, passwords, bank information, etc., but it turned out that it actually is its own sophisticated criminal that is independent of CWS. This case is currently under investigation by the FBI.

Spyware makers may perpetrate another sort of fraud with dialer programs spyware, called wire fraud. Dialers cause a computer with a modem to dial up a long distance telephone number instead of the usual ISP. Connecting to the number in question involves long distance or oversea charges, and this can result in massive telephone bills, which the user must either pay or contest with the telephone company.

Another type of spyware has piggy backed on a more legitimate use of computer technology called cookies. Anti-spyware programs often report web advertiser's HTTP cookies as spyware. Websites set cookies, most times legitimately, to track web browsing activity. For instance, to maintain a shopping cart for an on-line store, a cookie is set and, when the user leaves the website, the cookie maintains the list of items in the shopping cart so that when the user returns they can go back to their shopping cart and continue shopping from where they left off.

Only the website that sets the cookie can access it. In the case of cookies associated with advertisements, the user generally does not intend to visit the website which sets the cookies but gets redirected to a cookie setting third party site referenced by a banner ad image. Some web browsers and privacy tools offer to reject cookies from sites other than the one that the user requested. Advertisers use cookies to track people's browsing among various sites carrying ads from the same firm and, thus, to build up a marketing profile of the person or family using the computer. For this reason, many users object to such cookies and anti-spyware programs offer to remove them.

As the spyware threat has worsened, a number of techniques have emerged to counteract it. These remedies and prevention include programs designed to remove or to block spyware, as well as various user practices which reduce the chance of getting spyware on a system. Nonetheless, spyware remains a costly problem.

Moreover, the unsuspecting computer user may not even be aware that spyware is loaded on their computer and is, thus, vulnerable to all risks of losing security and subjecting themselves to spyware capabilities. Over the last several years, many programmers and commercial firms have released products designed to remove or block software. Some of the common names that you hear in the market today are programs such as Lavasoft's Ad-Aware, Spybot Search and Destroy, and, more recently, Microsoft has released their own version of a spyware blocker.

Anti-spyware programs are capable of combating spyware in two ways. They provide real-time protection, which prevents the installation of spyware, and they also detect and remove spyware that has been loaded onto a user's machine. However, like most anti-virus software, frequent updates are required to actually combat the threat of spyware. As new spyware programs are released, anti-spyware developers discover and evaluate them and make signatures and definitions which allow the software to detect and remove the spyware. As a result, anti-spyware software is of limited usefulness without a regular source of updates.

If a spyware program is not blocked and manages to get itself installed on a machine, it may resist attempts to terminate or uninstall itself. Once a spyware loads its dynamic link libraries (DLLs) into the memory of a computer, they can be very difficult to remove and require expert intervention to be removed. In addition, users are tricked by the malicious programmers who have released numbers of fake anti-spyware programs, and widely distribute these fake anti-spyware programs over the internet with fake warnings that computers have been infected and various other marketing ploys.

Lastly, in recent years, there has been a dramatic increase in identity theft because of these vulnerabilities, and other vulnerabilities such as viruses and Trojan horses. Large corporations are themselves vulnerable to these threats. These same large corporations have databases of our personal information that include users' names, addresses, social security numbers, drivers' license numbers, credit card histories, medical records, and financial information. Over the last four years, companies such as Lexis Nexis, Visa, and other large corporations have been attacked by hackers who have commandeered one or more of their databases to gain access to thousands and thousands of personal files of the many users of these services. Afterward, Federal and company investigators look to find out what happened and what caused the security breach. However, after the information is stolen, there is nothing that they can do to get it back from distribution in criminal networks. In one instance, a database known as Choice Point Incorporated said that it had been commandeered and had the personal information of 145,000 Americans compromised by thieves posing as small business customers.

It is foreseeable that as more spyware achieves greater sophistication in the coming years, the need for a secure mode of storing data would be preferred. It would be a technical advantage if the program could allow users to retrieve information without storing the password. It would be a further technical advantage if the users' stored data could be encrypted with that same unstored password, known only to the user. Lastly, it would be a technical advantage if there is a useful security method of utilizing user entered data to develop a security wall which cannot be penetrated unless a user knows the unique code.

SUMMARY OF THE INVENTION

A method for protecting data of at least one password-protected account of a user in a system comprises the steps of:
(a) creating, by the user, a password-protected account associated with a user identification and a password on the system;
(b) hashing the password and storing the hashed password in a first password digest in a database;
(c) receiving credential data from a user, including the user identification and password;
(d) requesting, from the database, the first password digest based upon the received credential data;
(e) receiving, into volatile memory, the first password digest from the database in response to the request;
(f) hashing the received password as the credential data and creating a second password digest;
(g) receiving, into volatile memory, the second password digest;
(h) comparing, in volatile memory, the first password digest with the second password digest; and
(i) authenticating the user based upon the comparison.

The method further includes steps to utilize the user's password as a portion of a system generated encryption key. All steps utilizing the password are secret in order to protect the confidentiality of the password.

In addition, the method may optionally include a shaker list to reduce the chances of attacks by key loggers and spyware.

A cryptographic system comprises an authenticator that determines if user credentials are validated to enter a specified account to view user data. The system includes an encryption module which operates on entered data using an entered password of the user credentials to build a superkey to encrypt and decrypt data entered by a user. The system also comprises storage accessible from the authenticator that stores a user identification, an encrypted password, and the user data in encrypted form. Volatile memory is controlled by the authenticator configured to obtain and operate on data fields passed to it by the authenticator. A user interface is connected to the authenticator for receiving user input data in the form of a URL, a user name, a user identification, a password, an e-mail, a search result, a cell phone number, a credit card number, a personal identification number, a product key, a personal note, bank account data, a search results/link detail, diary/journal weblog data, a mailing address, a social security number, biometric data, a document, financial data, personal data, compiled data, summarized data, a communication, an attachment, internet data, history data, or any combination thereof, wherein the computer authenticates a user in the system upon successful comparison.

DESCRIPTION OF THE PREFERRED EMBODIMENTS

A cryptographic system using volatile allocation of a superkey is described. In the following description, numerous specific details are set forth in order to provide a more thorough description of the present invention. It will be apparent, however, to one skilled in the art that the present invention may be practiced without these specific details. In other instances, well-known features have not been described in detail so as not to obscure the invention.

Figure 1A:
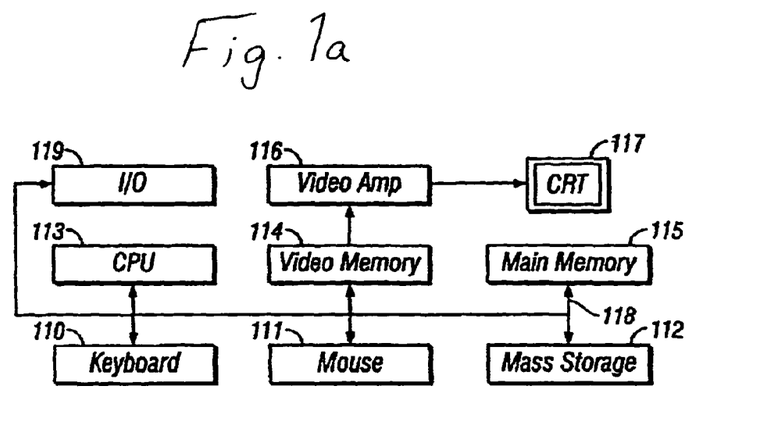
FIG. 1a provides an illustration of a computer system that can be used with the invention according to an embodiment of the invention.

The present invention can be implemented on a general purpose computer, such as illustrated in FIG. 1a. A keyboard 110 and mouse 111 are coupled to a bi-directional system bus 118. The keyboard and mouse are for introducing user input to the computer system and communicating that user input to CPU 113. The computer system of FIG. 1 also includes a video memory 114, main memory 115 and mass storage 112, all coupled to bi-directional system bus 118 along with keyboard 110, mouse 111 and CPU 113. The mass storage 112 may include both fixed and removable media, such as magnetic, optical or magnetic optical storage systems, or any other available mass storage technology. Bus 118 may contain, for example, 32 address lines for addressing video memory 114 or main memory 115. The system bus 118 also includes, for example, a 32-bit DATA bus for transferring DATA between and among the components, such as CPU 113, main memory 115, video memory 114 and mass storage 112. Alternatively, multiplex DATA/address lines may be used instead of separate DATA and address lines.

In the preferred embodiment of this invention, the CPU 113 is a 32-bit microprocessor manufactured by Motorola, such as the 680X0, or Power PC processors or a microprocessor manufactured by Intel, such as the 80X86, or Pentium processor. However, any other suitable microprocessor or microcomputer may be utilized. Main memory 115 is comprised of dynamic random access memory (DRAM). Video memory 114 is a dual-ported video random access memory. One port of the video memory 114 is coupled to video amplifier 116. The video amplifier 116 is used to drive the cathode ray tube (CRT) raster monitor 117. Video amplifier 116 is well known in the art and may be implemented by any suitable means. This circuitry converts pixel DATA stored in video memory 114 to a raster signal suitable for use by monitor 117. Monitor 117 is a type of monitor suitable for displaying graphic images.

Figure 1B:
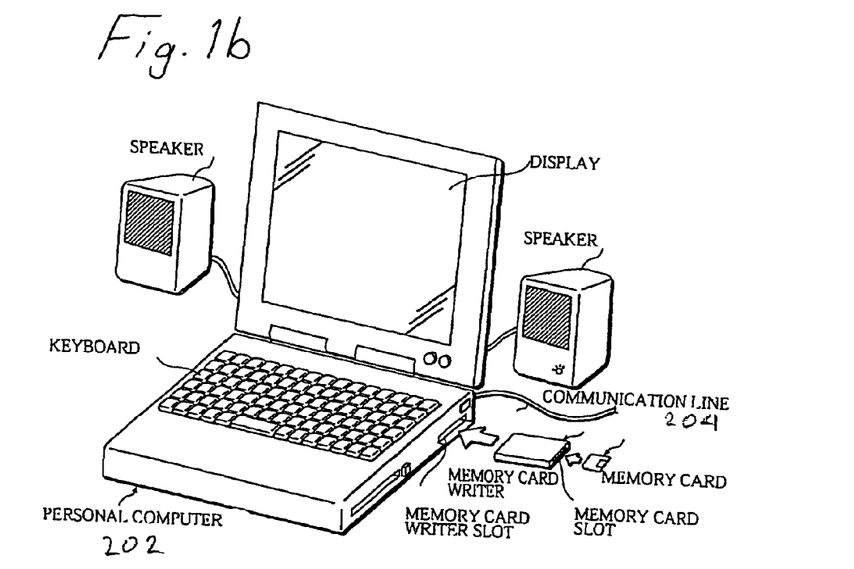
FIG. 1b provides an illustration of a computer system that can be used with the invention according to an embodiment of the invention.

The computer system described above is for purposes of example only. The present invention may be implemented in any type of computer system or programming or processing environment. In FIG. 1*b*, a personal computer 202 is shown embodying the modules of the computer. A communication line 204 of the personal computer 202 is shown. The communication line 204 is connected to a local network or directly to the internet or remote storage.

With further reference to FIG. 1*b*, each computer 202 includes a microprocessor, a computer storage, and a communication line 204. Each computer 202 can also include a media drive, such as a disk drive, CD-ROM drive, and the like. Media drive can operate with a computer storage medium capable of storing the computer software, which computer software is able to configure and operate computer 202 in a manner to implement the present invention. Each computer 202 can include a keyboard, a mouse, and/or a display. Each computer 202 is exemplary of a computer capable of executing the computer software of the present invention and is not to be construed as limiting the invention.

Figure 2:
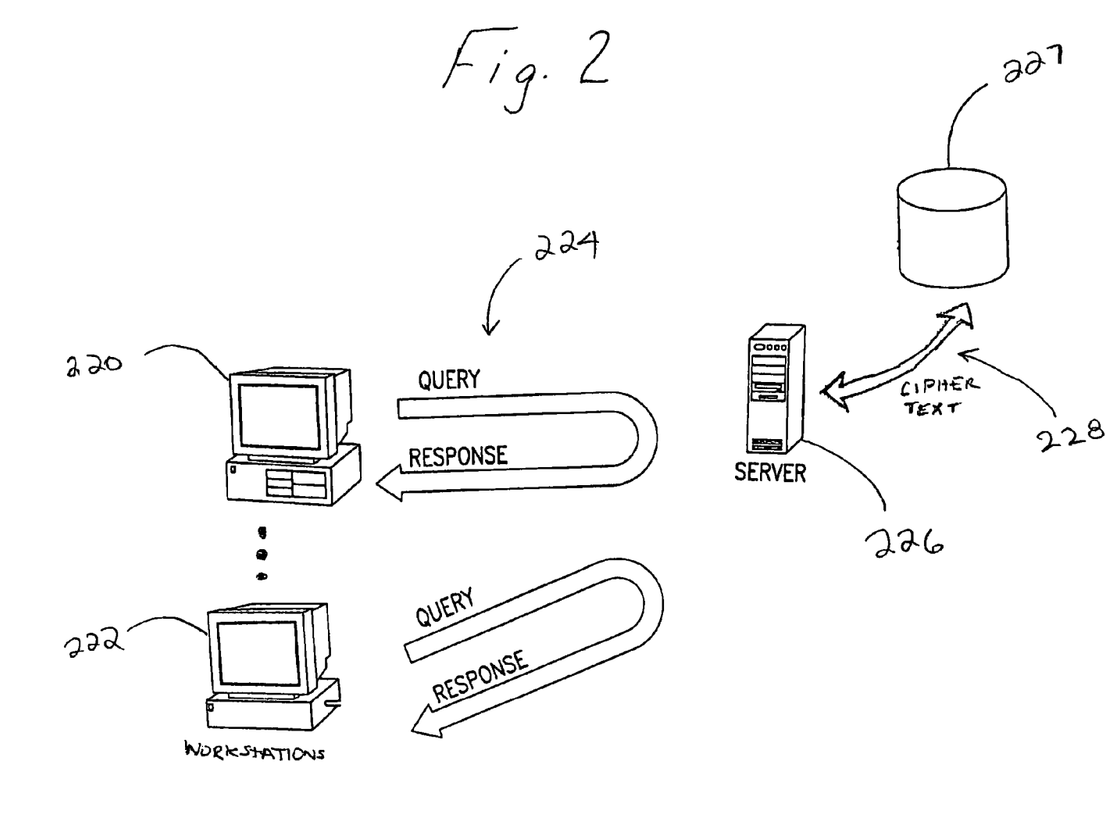
FIG. 2 provides a topographical view of an embodiment of the invention that illustrates process flow.

FIG. 2 provides a simplified block diagram of an embodiment of the invention showing the subsystems in detail. In FIG. 2, the system is shown to comprise a series of computers for use together. These computers are used together to form a cryptographic computer system for secure storage of data. Workstation 220 could be a client server at a remote site or a workstation in the same internal network as a server 226. As is shown in FIG. 2, workstation 220 queries 224 the server 226 and receives a response from the server. As is also shown in FIG. 2, any number of workstations 220 can also query server 226. Server 226 holds the server software and also communicates through cipher text 228 to a database for storing encrypted and hashed data. Any software available to browse the internet can be used on workstations 220 and any additional workstations 222. It is also known that the invention can be loaded separately onto a workstation to be run on workstation 220 in stand-alone mode. In this embodiment, the software of the server is combined with a client interface to run directly on workstation 220.

Figure 3:
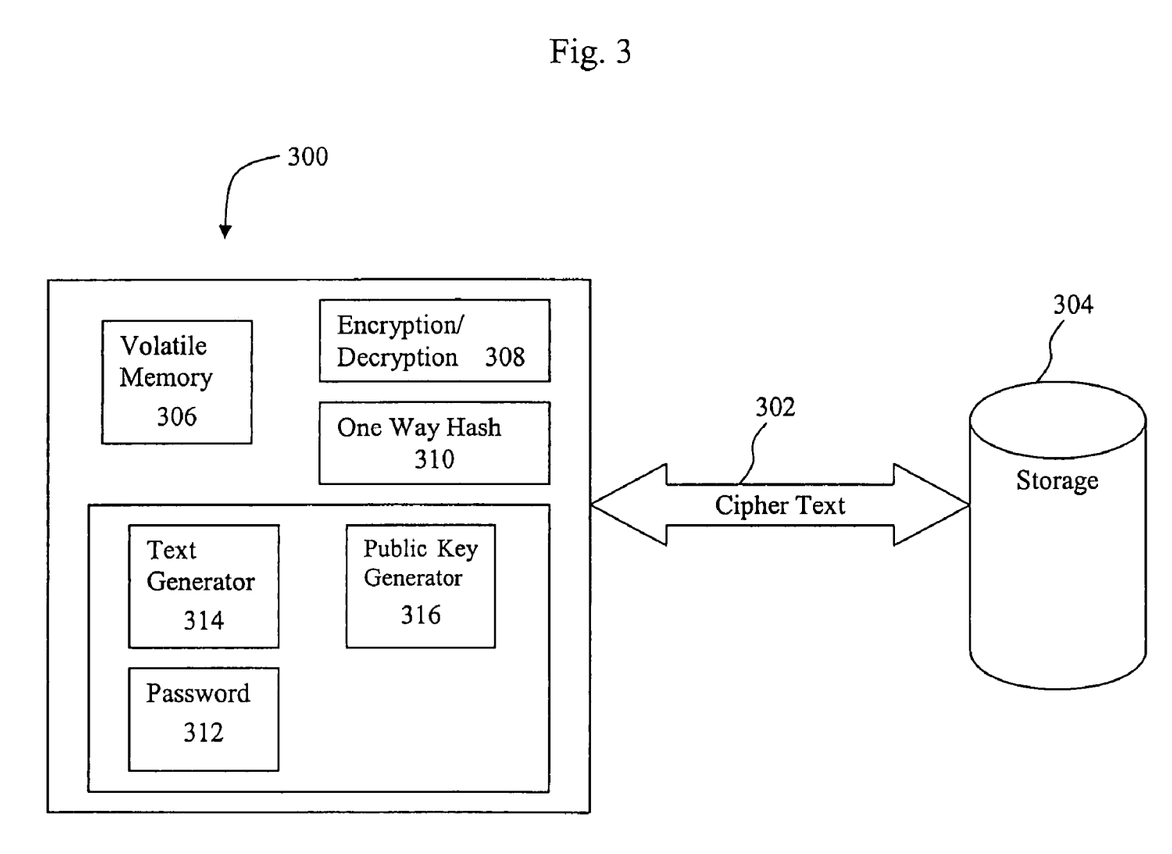
FIG. 3 provides a block diagram of at least one embodiment of the inventive cryptographic system in line with a preferred embodiment.

In FIG. 3, a password verification system is shown. Password verification module 300 is shown passing cipher text 302 directly into a storage module 304 to store cipher text data.

The modules that are included in authentication module 300 are included to encrypt and decrypt information, to one way encrypt information, as well as to create public keys. As is shown in FIG. 3, an encryption/decryption module 308 is used by the authentication module 300 to encrypt data into an encrypted mode and also to decrypt information from an encrypted mode. Once encrypted, user-data is passed to the storage module 304 via the cipher text 302.

As well as encrypting and decrypting, the authentication module 300 also can hash. A cryptographic hash function is a hash function with certain additional security properties which make it suitable for use as a primitive in various information security applications, such as authentication and message integrity. A hash function takes a string or a message of any length as input and produces a fixed length string as output, sometimes termed a message digest or a digital fingerprint.

With further reference to FIG. 3, the encryption of encryption module 308 is a process of obscuring information to make it unreadable without special knowledge. Encryption can be used to ensure secrecy but other techniques, such as hashing, are also needed. The encryption function can be unencrypted, while the hash function is an encryption. It is called an encryption because it cannot be decrypted. Once hash module 310 has been operated on a string or a message, that message can never be decrypted. However, with hash module 310, once the hash module is created with a message digest, it is possible to re-hash the message and compare the results to the first created message digest and verify that it was the same original message. Therefore, the present invention utilizes encryption to protect data which the user stores in the system but must view again by creating a public key in operations module 311. However, the hash 310 is used to protect the user password to ensure it will not be known to anyone other than the user. These two functions operate together to pass ciphered text to the storage module 304 and, in combination, act to give the present invention a mode for securing any data that the inventor wishes to secure.

With further reference to FIG. 3, operations module 311 has a password 312, a text generator 314, and a public key generator 316. At this time, it is important to emphasize that all of the operations that take place in this authentication module 300 pass their data into volatile memory 306. This is an important point because this volatile memory 306 is never stored anywhere on the permanent storage of the authentication module system 300, thereby protecting the confidentiality of the user password 312 and, in turn, any encrypted data.

To understand the importance of volatile memory 306, the operations of operations module 311 must be analyzed. In operations module 311, a password 312 is entered into the system. The password 312 is passed to a text generator 314, which operates on the password 312 to create a random textual component, which is connected to password 312. Once the operation on password 312 and the text generator 314 have taken place, the resulting output is sent to public key generator 316. Public key generator 316 stores its contents in volatile memory 306 during the operation module's 311 activity and while this activity is taking place. While the public key generator 316 of operations module 311 is contained in volatile memory 306, the authentication module 300 operates on data using encryption/decryption module 308.

In the preferred embodiment, hash 310 is utilized on the password 312 stored in volatile memory 306 to create a password digest, which is sent by cipher text 302 into permanent storage 304.

FIG. 3 shows the authentication module 300 operating solely on passwords, however, as will be shown, the system is capable of storing URLs, credit card numbers, telephone numbers, street addresses, passwords, or any other type of information.

In order to store information in a secure manner, the present invention takes a password 312 from the user so that the user can access his/her account. This password 312, through the operation module 311 as shown in FIG. 3, is never stored on either the local system or in any other remote database. This method of not storing the password gives the present invention novelty from the prior art because the password is never written other than by the user and the password is never known other than by the user. Therefore, while there is some risk that the password may be forgotten by the user, there is no risk that anyone in operations, any administrator of the system, or any hacker of the database, the server, or any other parts of the system could possibly find out the password.

The cryptographic system serves the purpose of securing any information stored in the system by the user. Therefore, there are two levels of security. First, the password as entered is not saved and is not known to the administrator of the system or anybody else that has a function of operating the system. Once the password is entered, then the user can begin entering other data and, as will be shown, this data is encrypted with a superkey containing the confidential password and is also stored in the database. At no time is any of the information accessible other than in its encrypted form and, therefore, it is private and secure at all times.

In addition to the heretofore mentioned aspects of the present invention, two additional aspects are also novel: a shaker list and a negative shaker list. A shaker list is a list created by the user by selecting a number of items that they have stored in the database. Once they have selected these items, a list of their selections is compiled. This list is called a shaker list and will be used to further protect information stored in the cryptographic system. A shaker list provides a user with an option for a heightened level of security on all data or portions of data.

In addition to a shaker list, there is also a negative shaker list. The negative shaker list is similar to the shaker list, however, the negative shaker list is created from the non-selected items in the list of items that the user has stored in the database. In other words, the user sees a list of items that could be the URLs he has stored in the database he selects from the list of URLs and triggers the system to use the URLs that the user did not select as a negative shaker list.

Once a shaker list and a negative shaker list or any combination thereof is created, the user can turn them on and off at will if he/she knows the password. In this case, password refers to the unique compilation of the lists. A shaker list may be used in combination with other shaker lists since, in one embodiment, a user may have hierarchical directories implemented with a different shaker list at each level.

As known in the art, volatile memory is computer memory that requires power to maintain the stored information. Most forms of random access memory are volatile storage including dynamic random access memory (DRAM) and static random access memory (SRAM). At no time is any unencrypted information stored in non-volatile memory, such as the computer database, hard drive, floppy disk, or optical drives. The only use of non-volatile memory in the system is for the task of secondary storage of the ciphered text or the encrypted text. Once again, it should be emphasized that in the cryptographic system, at no time is any user information stored other than in volatile memory.

The benefits of using volatile memory are the utility it serves in limiting access to any of the data input by the user. Secondary benefits include speed and performance. In addition, if the system were to crash, all information entered by the users would be erased and, therefore, would not be able to be accessed by any rogue agents. The cryptographic system of the present invention implements authentication by verifying a stored encrypted digest against newly created hash digest of the user's password currently entered at the time of login. If the two are the same, authentication is successful. If the two are not the same, authentication fails. The stored hash digest is created initially when the user creates an account by inputting a password into a hash function and creating the hash digest. At the time of authentication, the same process is repeated on the current password. A password is entered and the hash digest created by inputting the password into the hash function and comparing the resulting hash digest to the stored hash digest.

Figure 4:
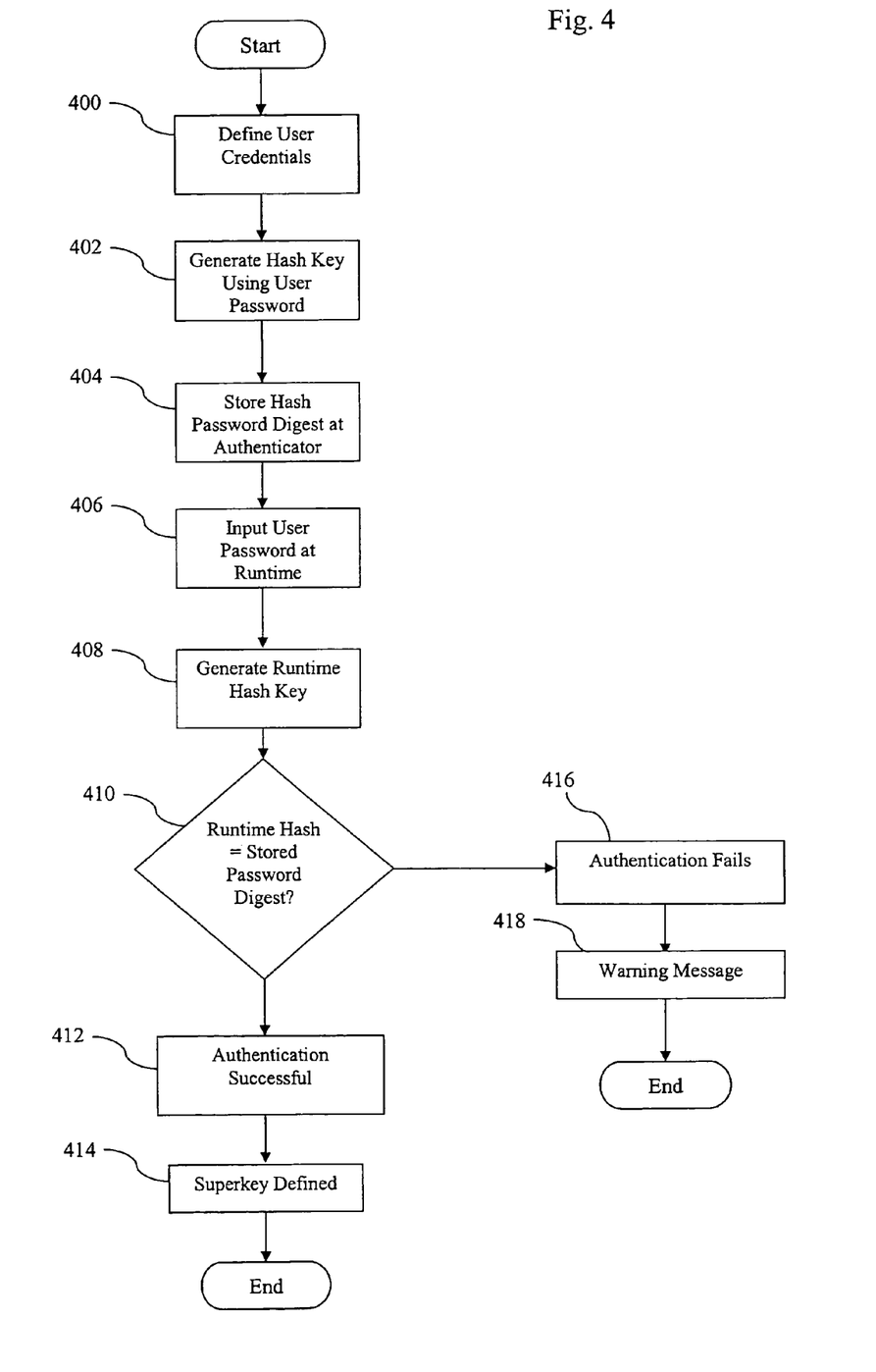
FIG. 4 provides an authentication process flow according to an embodiment of the invention.

Referring to FIG. 4, at step 400, a cryptographic system is used to define user credentials. The user enters the information that is needed, such as user name and/or password. At step 402, a cryptographic system generates a hash key using the user's entered password. Next, at step 404, the cryptographic system stores the hash password digest into the authenticator's database. At step 406, the user's password is input by a user of the cryptographic software system during runtime by entering the password through some input means known in the art. In other words, the password may be entered textually, dictatorially, by thumbprint, or by some other method. In the preferred embodiment, the password is entered by keyboard or by dropdown boxes.

With continuing reference to FIG. 4, at step 408, after the user has entered their password, the cryptographic system generates a runtime hash digest. The runtime hash digest generated in step 408 is a hash digest reflecting the password that was input by the user, presently. Next, at step 410, a decision is made by the cryptographic system. After the system has generated the runtime hash digest, the system must then compare the runtime hash digest to the stored hash digest received from the database in step 404. If the comparison is true, in other words, if the comparison is equal, both the hash password and the stored hash password are equal at step 412, the authentication is successful and, at step 414, the superkey is defined.

With continuing reference to FIG. 4, in step 410, if the runtime password and the stored hash password are not equal, then the authentication fails in step 416 and some type of warning message or other message is sent to the user in step 418.

The compare method in the preferred embodiment is a hash function compare. The preferred embodiment uses a software method MD5, which is an encryption method which allows the software to compare the stored result with the new result and, even without knowing what the password is, the system can tell if the user knows the password. However, this hash function is not intended to be limiting as any hash function can be utilized.

As discussed heretofore, key loggers are systems that can log any key punched on a keyboard; in addition, there are also screen scrapers and other utilities that function for capture screen images either streaming or static. One of the goals of the invention is to allow a user to not only keep his password to himself but also to foil the plans of key loggers and other rogue programs which try to steal passwords and utilize them for covert or other illegal or unethical activity. There are several methods that the present invention uses to get around key loggers. One method is by combining keywords with other on-screen choices to build a password. In one embodiment of the invention, the user would enter his password using three or four keystrokes on the keyboard and then using a mouse or pointer to choose a number of drop downs that are provided by the software of the cryptographic system. The drop downs in the key password are not meant to be limiting and any known input method can be used to get the password into the system.

The password is a critical aspect of the invention and the routines used to get the password in without being detected or known by any other users or administrators or other persons involved with the system is necessary to ensure the user that their password will never be known. The password is not only an entry into the system but, as shown, is a key for encrypting and storing all of the user's data into the system. Therefore, the password is an entry into the system and is also the only word that will allow the user to gain access to database information once encrypted. Without the password, no one can see the data because it is encrypted.

Encryption is a routine that is known widely and has been used widely since the early 1970's to protect passwords to store data and to send data securely over the internet and any other network. However, the present invention is not limited by any type of encryption. In the preferred embodiment, a utility by the name of Blowfish is utilized in the software application. It is a utility written and coded in the programming language Perl, however, any encryption function could be used with the method and system of the present invention.

In order for the user to use the cryptographic system, an account must be created. An account is known in the art to encompass credentials, a password associated to a user name, which gives a user access to the cryptographic system. The important components of an account are user name, password, account settings, and user data. Account settings include any options the user has chosen. User data is any type of data the user has input, including but not limited to a URL, a user name, a user identification, a password, an e-mail, a search result, a cell phone number, a credit card number, a personal identification number, a product key, a personal note, bank account data, a search results/link detail, diary/journal weblog data, a mailing address, a social security number, biometric data, a document, financial data, personal data, compiled data, summarized data, a communication, an attachment, internet data, history data, or any combination thereof. In addition, an account has shaker lists and negative shaker lists, which will be described hereafter.

Returning to FIG. 4, step 402, to generate the hash key using a password, this function would be performed at the account creation time. Immediately thereafter, step 404, storage of the hash password digest would take place. Subsequently, step 406 would take place at any time thereafter when the user wishes to access the cryptographic system and access the software through the internet or through any other means available.

When a user enters their account information into the cryptographic system, in one embodiment, text boxes and a submit button are used to capture account information. However, some other type of function would be displayed on the screen, either a dropdown or a control box that the user could click in order to signal to the system that they are finished entering their information. At that time, the cryptographic system would pass the information into its volatile memory and would begin creating the account. Once the user name and settings have been sent to a storage database, they would be associated with the hashed password digest, which would be sent using cipher text to the storage base of encrypted data.

Once the account has been created, the user, as has been discussed previously, is allowed into the system. In order to access the system, the user types in their credentials. Therefore, with reference again to FIG. 2, a user would be situated at workstation 220, would type their password and user name information at workstation 220 and would hit a signal to send a query 224 to the server 226, at which point the server 226 would operate on the information sent. With reference to FIG. 3, the software running on the server would encompass authentication module 300.

Authentication module 300 would use the password 312 to authenticate against a stored hash digest, then pass the password 312 to a text generator 314 and create a public key 316 from the password 312. A user can now begin entering their URLs into the system and these would be encrypted using the public key 316 and sent by a cipher text 302 into the storage database 304.

As shown in FIG. 3, the temporal arrangement is not meant to be limiting, the public key 316 could be generated at any time before or after or even contemporaneous with the hash function 310 of the password 312. The critical aspect is that the password 312 has never left volatile memory 306 while the authentication module 300 is operating on it. The only time the password 312 leaves the authentication module 300 is when it is sent by cipher text 302 to the database 304.

In FIG. 3, the password 312 is operated on in operating module 311. Text generator 314 provides additional security by increasing the complexity of the password, thereby decreasing the chance it can be cracked. The password 312 is passed to the text generator 314, which performs operations to add additional characters onto the password 312. For example, in one embodiment, the password is passed to text generator 314, which then uses the password with the second and sixth letter of the user's e-mail address and, also, the second number of the zip code and the second number of the first name to form a random text string. The string is added to the password and used to create a superkey. This routine is known to the operators of the cryptographic system and the software knows how to replicate this operation in order to create the key for decryption purposes. It should be pointed out that the password is never known. Only the additional random text string, which the system is providing in the form of further characters in this embodiment, is known by the system. However, this random string and the procedure of creating it are not revealed to the public. With regards to text generator 314, any procedure can be used to provide additional characters. Once created, encryption/decryption module 308 utilizes the superkey to encrypt and decrypt data.

Figure 5A:
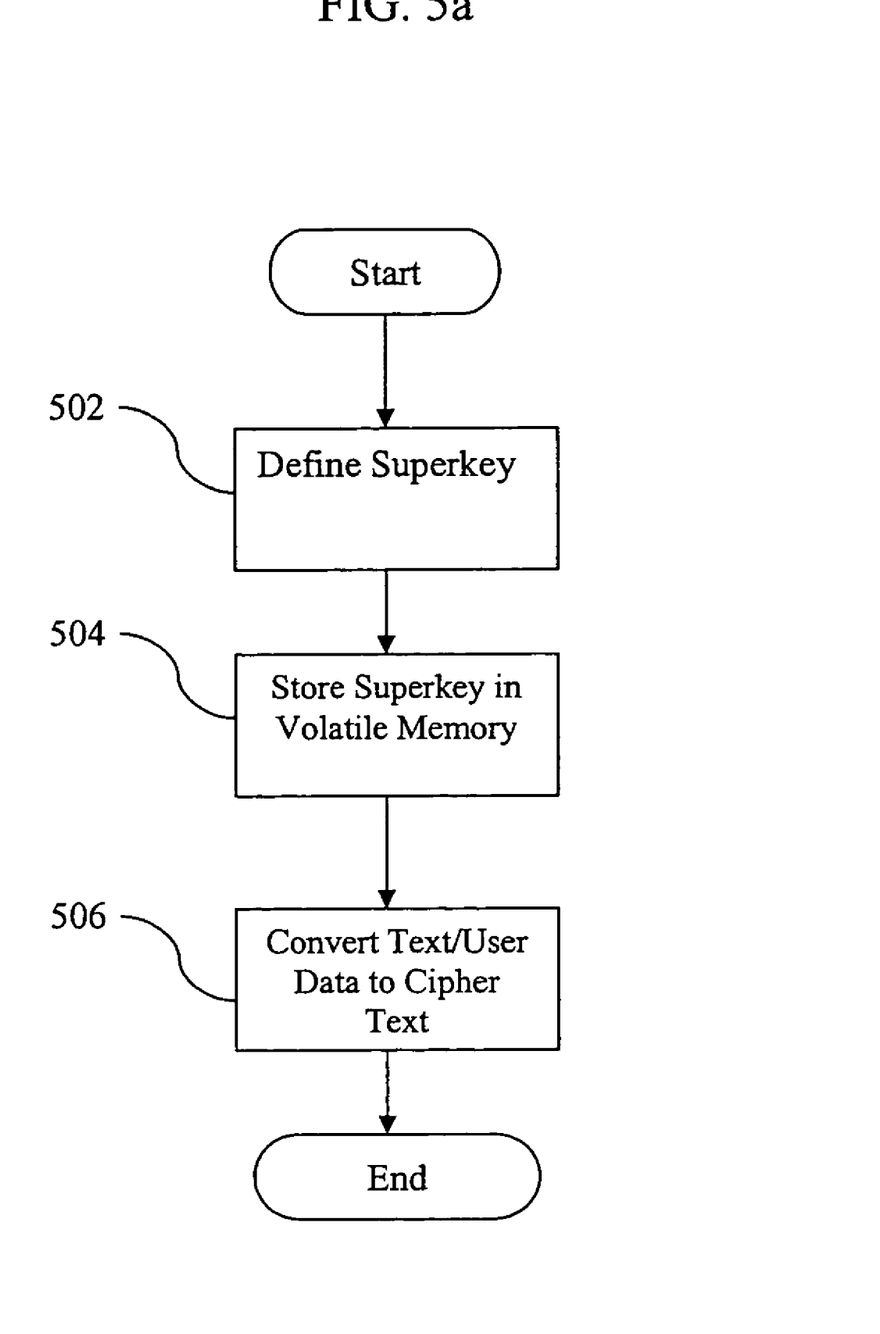
FIG. 5a provides an encryption process flow according to an embodiment of the invention.

With reference to FIG. 5a, step 502 shows the step of defining the superkey. Definition of the superkey takes place in the operations module 311 of FIG. 3 and is passed to the encryption/decryption module 308. With continuing reference to FIG. 5a, in step 504, the superkey is stored in volatile memory 306. Step 506 converts the textual information inputted by the user into cipher text.

Figure 6:
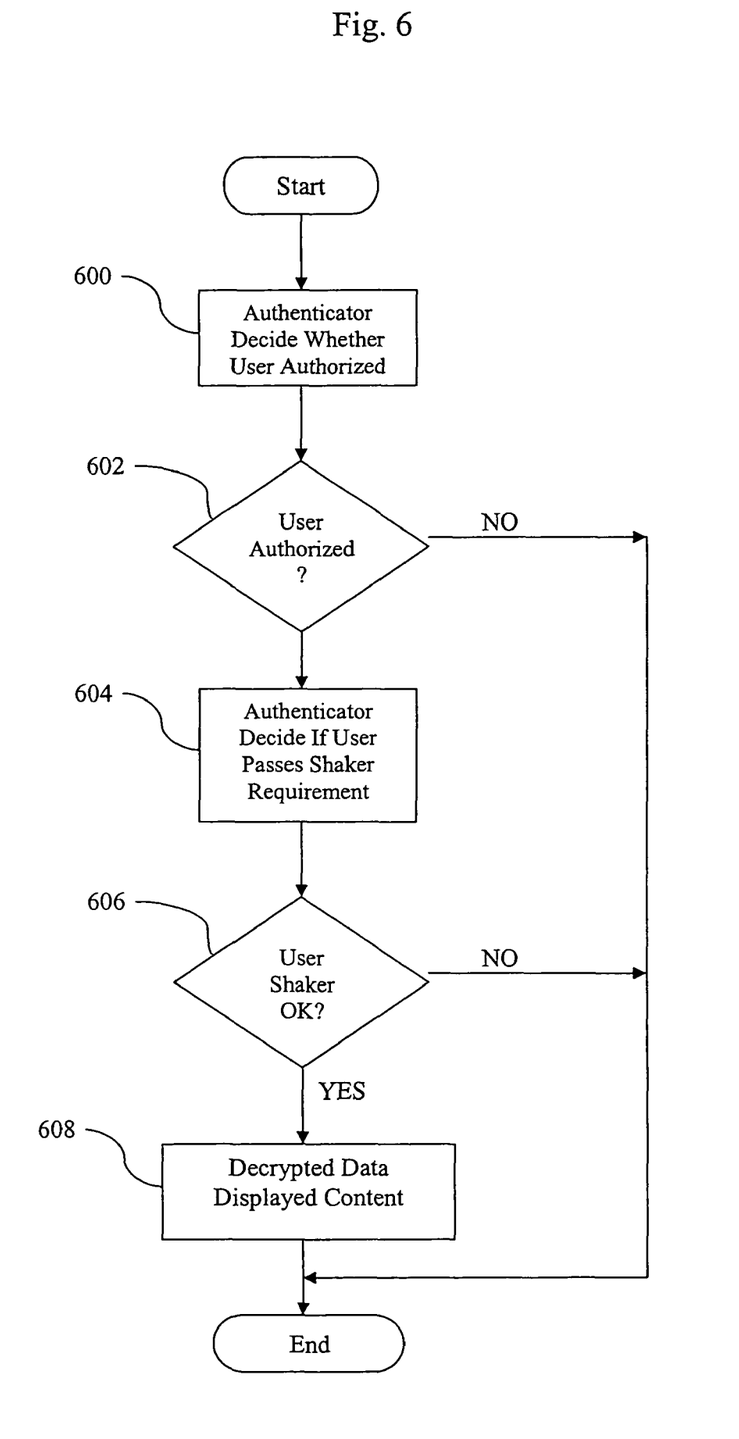
FIG. 6 provides an alternate authentication process flow according to an embodiment of the invention.

With reference to FIG. 6, in step 600, the authentication module compares the user password digest to the stored password digest to determine if the user has authenticated. In step 602, if the user is authorized, then, in step 604, the authentication module decides if the user passes the shaker requirement. In step 606, a decision is made in the software to determine whether the user is using a shaker list and, if it is, in step 608, the authentication module 300 decrypts any data in the database that is owned by the user and displays content. The authentication module 300 has a switch for turning on and off a shaker list (not shown). If the shaker list is not on, then the user does not have to enter a shaker list. If the shaker list is on and the system requires a user to enter the shaker list, then, in step 606, when the user enters the shaker list and it does not match with the stored shaker list, the user is not authenticated and the user session will end.

Once the user is authenticated, an initial session is created. When the session is initialized, the authorization module retrieves user settings from the account database. In addition, it retrieves any URLs or other data that is stored in the encryption database and displays a page to the user showing all this information with proper settings and any other screens that the user requires.

User authentication is critical to enter into an initial session. There are several steps that the user must go through to gain access. If a user is not authenticated, then the stored data remains stored and encrypted permanently. In other words, even if the user is authorized to get the information without the password and the shaker list, the user will not be authenticated and will not be able to gain the information.

If the user is not authenticated, they will be removed from the system, there will be no session created, and there will be no initialization of runtime variables. No information leaves the encrypted storage database before authentication. With reference to FIG. 3, the cipher text 302 will not leave database 304 until the proper password has been given and the user authenticated. In one embodiment, the user is given two tries to enter the system and then is locked out and, therefore, the user doesn't know his password is locked out of the system until he calls the system administrator or administrator of the systems and actually communicates with a cryptographic system command center.

After the user is authenticated, the user will be allowed to input or output URLs. The user can create a shaker list. The user can create a negative shaker list. The user is allowed to input URLs data. The invention is not limited to URLs, however. The invention can also be used for passwords, user names, credit card numbers, telephone numbers, passwords, e-mails, search results, cell phone numbers, credit cards numbers, product keys, personal notes, personal identification numbers (PINs), bank accounts, search results or link details, diaries, journals, blogs, mailing addresses, or social security numbers.

In the present invention, storing URLs is useful since a user can enter, for example, a URL for their Yahoo account and then associate a password and user name to that account. The user would then signal to the cryptographic system to encrypt the URL password and user name for Yahoo and it would be encrypted and sent by cipher text to the database. In another embodiment, the user could have the option to heighten security, in essence creating an additional password for the particular URL user name/password combination. Once the user has entered the URL into the system, he can enter as many additional URL/password combinations as needed. After logging off the cryptographic system, the information is stored and encrypted in the database. On log in, the information is unencrypted and displayed to the user.

The system can display the stored URLs in a list on their screen. By hovering over the URL, a user can see the user name and password, if authenticated. In the preferred embodiment, the user can then copy and paste or drag and drop the password into a web browser user name box or a web browser password box in the URL being referred to by the URL. The user can also click on the URL and the system creates a new window with the web page shown.

Figure 5B:
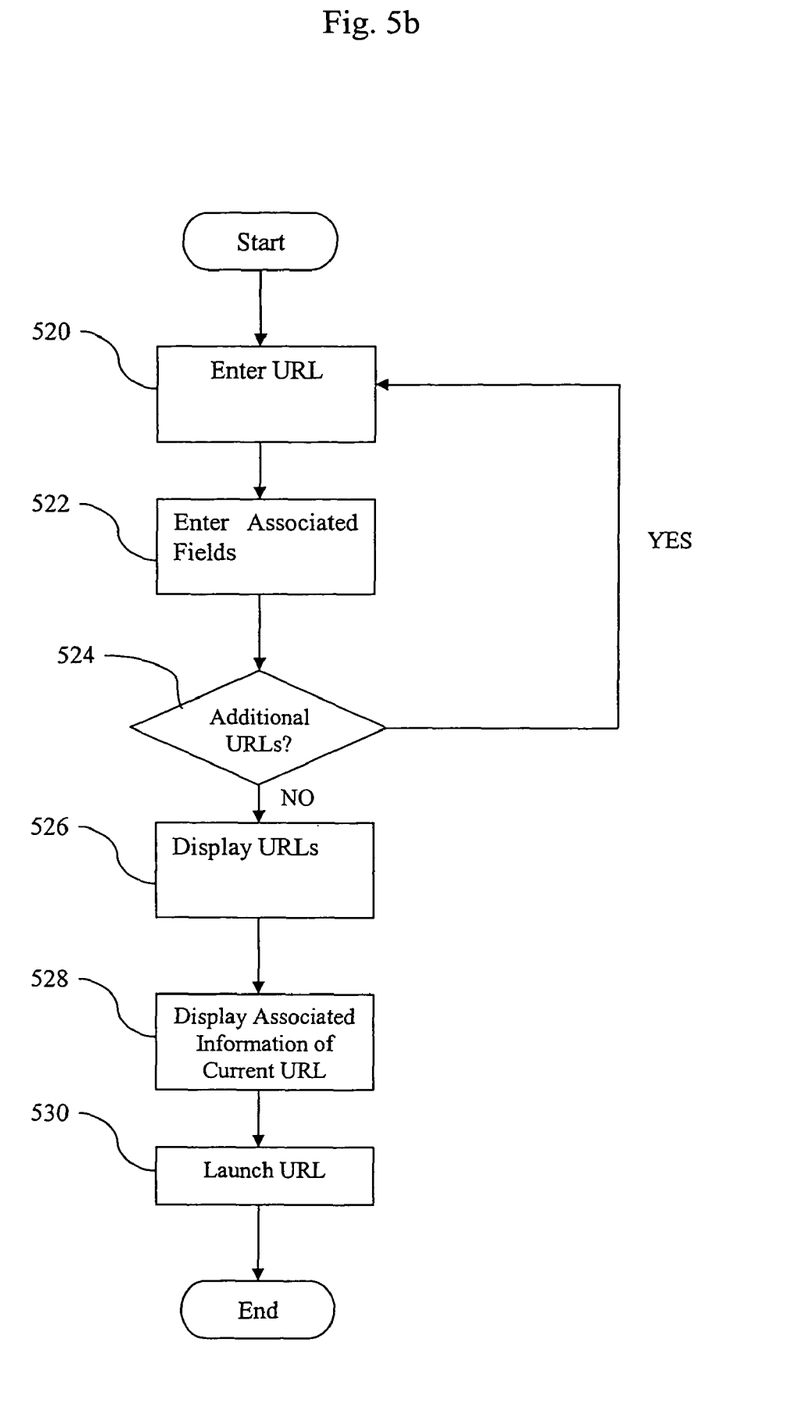
FIG. 5b provides a detailed view of data entered for encryption process flow according to an embodiment of the invention.

With reference to FIG. 5a, in step 506, the user enters a URL and the text of the URL is converted into cipher text using the defined superkey in step 502. In further detail, FIG. 5b shows the process flow the system follows when entering data, the user enters the uniform resource locator identifying the web page at step 520. In step 522, the user enters any associated data, generally, data associated with the URL including user name, password, e-mail address or any other data, and the type of associated data is not meant to be limiting. In step 524, the decision is made by the user to enter additional users' URLs, and the software reiterates through steps 520, 522, and 524 until the user has entered a significant list of URLs. Once the user enters into step 526, he has a list of URLs that can be displayed. In step 528, the user displays associated information of a selected URL by rolling over, or mousing over as is known in the art, a selectable URL from the list. In step 530, the user will launch the URL into a new window or the current window, whichever the user chooses.

At the end of the user's session, he has entered a list of URLs as discussed in step 526 of FIG. 5b. At this time, the user logged into the system has the option of creating a shaker list.

A shaker list is a user-defined list of items picked from the items stored in the database. In other words, the user picks a subset of the group of all items in the database associated to his account, all items stored in his account, or all items in a particular folder within his account. The selected items are then compiled into a list and stored in the database. If the user has turned on the shaker list requirement, then each time the user enters into the cryptographic system, the user must enter the shaker list to gain access to the data that is encrypted into the database. In other words, with reference to FIG. 6, if the user has chosen to use the shaker list, there is the normal user authorization at 602 and then the user must enter the shaker list to be authenticated into the database at step 606. At step 608, the cryptographic system would decrypt the data after these were authenticated.

Figure 7:
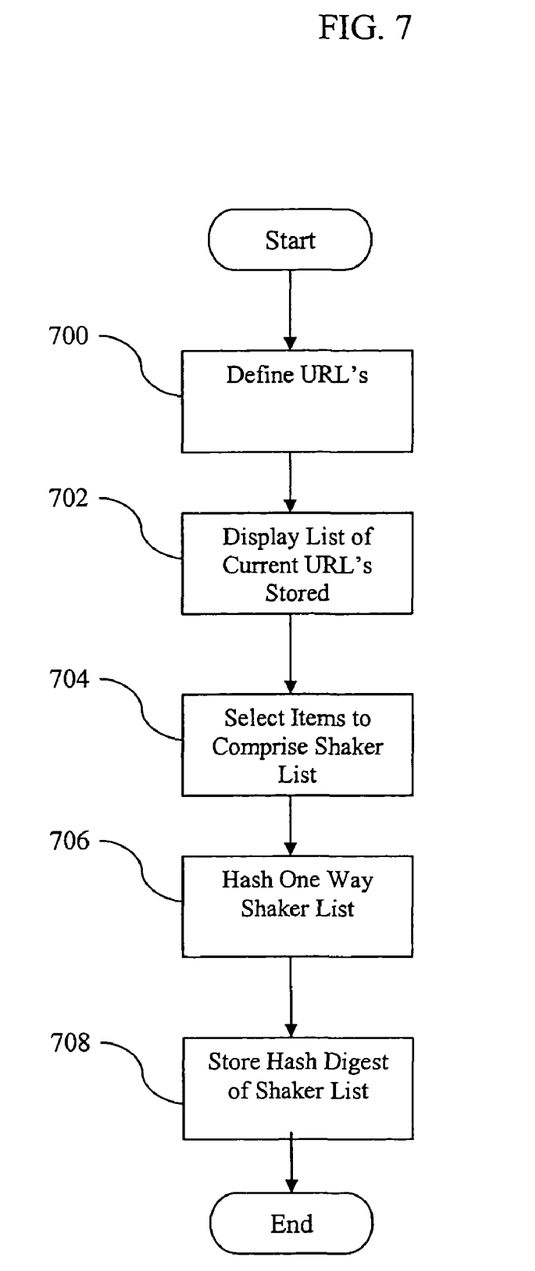
FIG. 7 provides a shaker list process flow according to an embodiment of the invention.

With reference to FIG. 7, in step 700, the user defines the URLs as shown in FIG. 5b. The user displays a list at step 702 of the current URLs stored in a database. In the preferred embodiment, there are multiple views of data stored in the database and the concept of hierarchical views is used throughout the preferred embodiment, therefore, data that is stored in the database may not show up in the current view but is retrieved from the database as the user requested.

With continuing reference to FIG. 7, in step 704, the selected URLs are compiled into a shaker list. The user, at step 704, browses a display list and would have a check box next to each URL to check in the box if they wanted that link to be part of their shaker list. In step 706, the selected URLs are compiled into a list and this list is stored into a temporary storage variable. A hash function is performed on the variable to create a hash digest.

The hashed digest has been created out of the shaker list and can be stored in the database in step 708. Once the shaker list is activated and stored in reference to FIG. 6, the user has approved the use of the shaker list in step 606 and it is up to the user to remember their shaker list. If the user enters the shaker list properly, the system retrieves the data in step 608 and the decrypted data is displayed onto the user's workstation.

Figure 8:
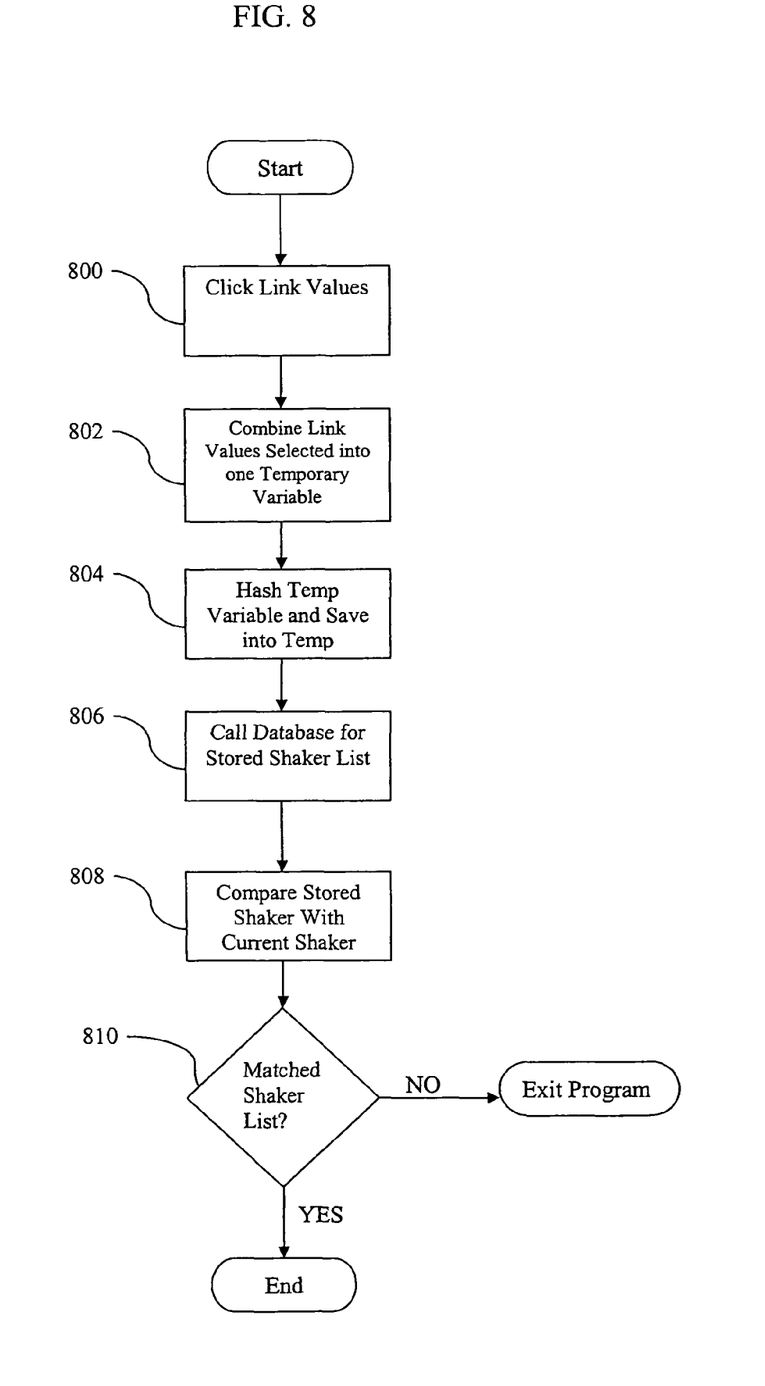
FIG. 8 provides a shaker list process flow according to an embodiment of the invention.

In greater detail, the steps of FIG. 7, step 708 and step 706, are further broken down in FIG. 8. In step 800, the user clicks the link values and selects the list. The user is clicking on the links as they remember them in order to gain access to the encrypted data. In other words, the user in some prior session has already decided to activate the shaker list and has selected the items of the shaker list and the cryptographic system has stored the shaker list into the database. In step 802, the cryptographic system combines the links that the user has selected and compiles them into one temporary variable, which is stored in volatile memory. In step 804, the system encrypts the temporary variables from step 802 and saves it again to volatile memory in a temporary variable. Next, in step 806, the database is called and a retrieval of the storage shaker list is accessed. The storage shaker list is not encrypted but, rather, is a hash digest that has been encrypted. Therefore, in step 808, the storage shaker list is compared to the shaker list that is stored temporarily, using a compare function, which decides whether or not they are the same value. As with the password, if the list is hashed and the user enters a new list and it is hashed, if those two variables are compared, they will be equal if the original list was equal. In step 810, if the lists are equal, the system authenticates the user. If the shaker lists do not match, the user is exited from the system.

In one embodiment, the user is allowed to see first-level URL information and is limited to that information only. If they cannot enter the shaker list, then they cannot see the passwords or the user names. In another embodiment, the user is completely blocked out and is not allowed to enter the system as not being authenticated and the session is not initialized.

Figure 9:
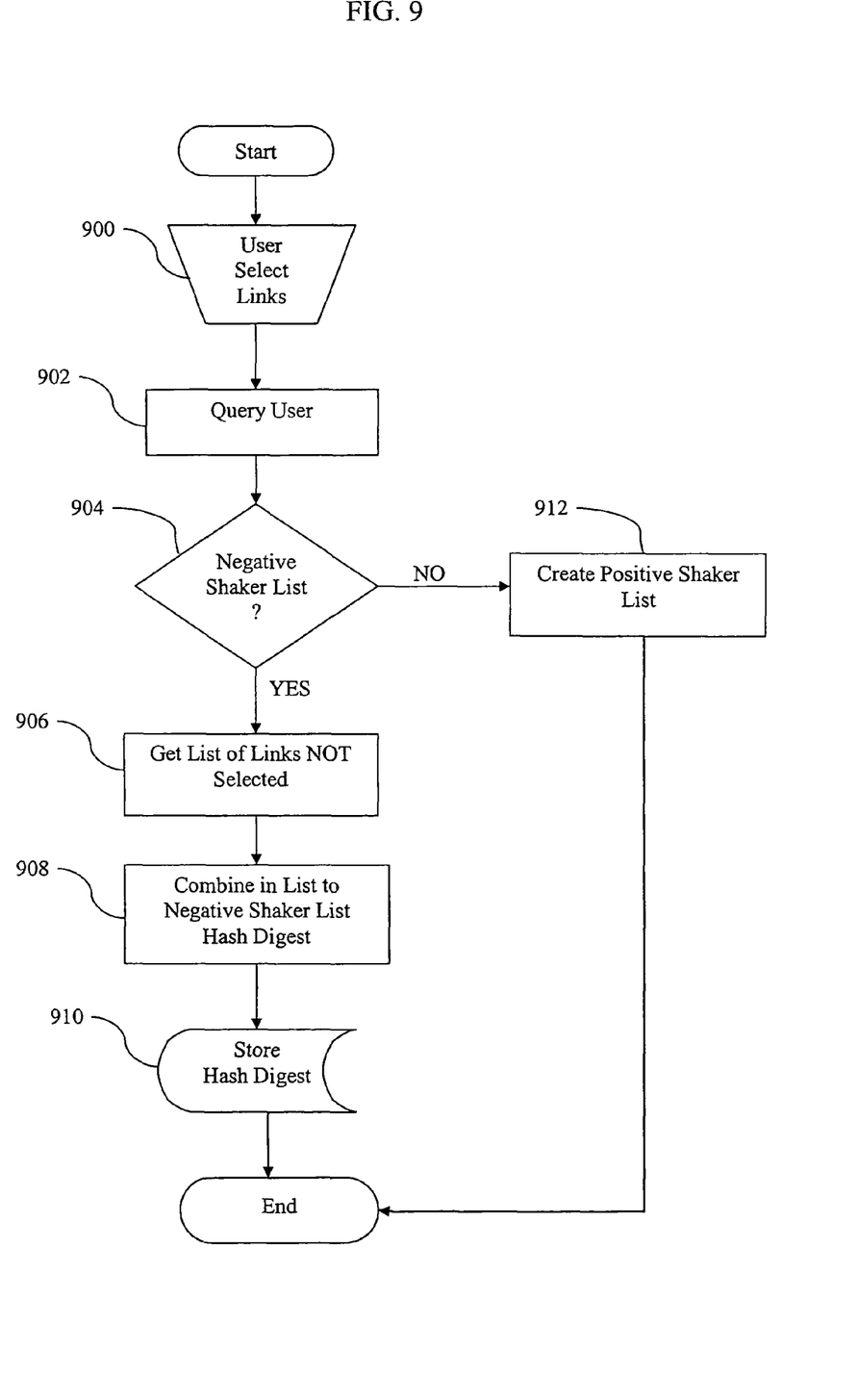
FIG. 9 provides a negative shaker list process flow according to an embodiment of the invention.

In addition to shaker lists, there are also negative shaker lists, which are a list of unselected items. With reference to FIG. 9 at step 900, the user selects links from the list of data elements. At step 902, the user is queried as to whether or not this is a shaker list or a negative shaker list. In step 904, if the user decides it is a positive shaker list, then the system at step 912 creates a positive shaker list. With continuing reference to step 904, if the user decides that this should be a negative shaker list, then the user must select a list of links. At step 906, the system takes the unselected links and, in step 908, combines that into a list. The list is then sent, in step 910, to the hash module where it is hashed into a digest. Once it is a hashed digest, it can be sent by cipher text into the storage module for storage. Once the user has set this user list and has selected a negative shaker list, they must enter it any time they enter the system. Therefore, the next time the user logs on, it will be authenticated to the first level with their password and then, in order to see the additional data in the system, they will be required to enter the negative shaker list by clicking on all of the elements that were not selected.

Figure 10:
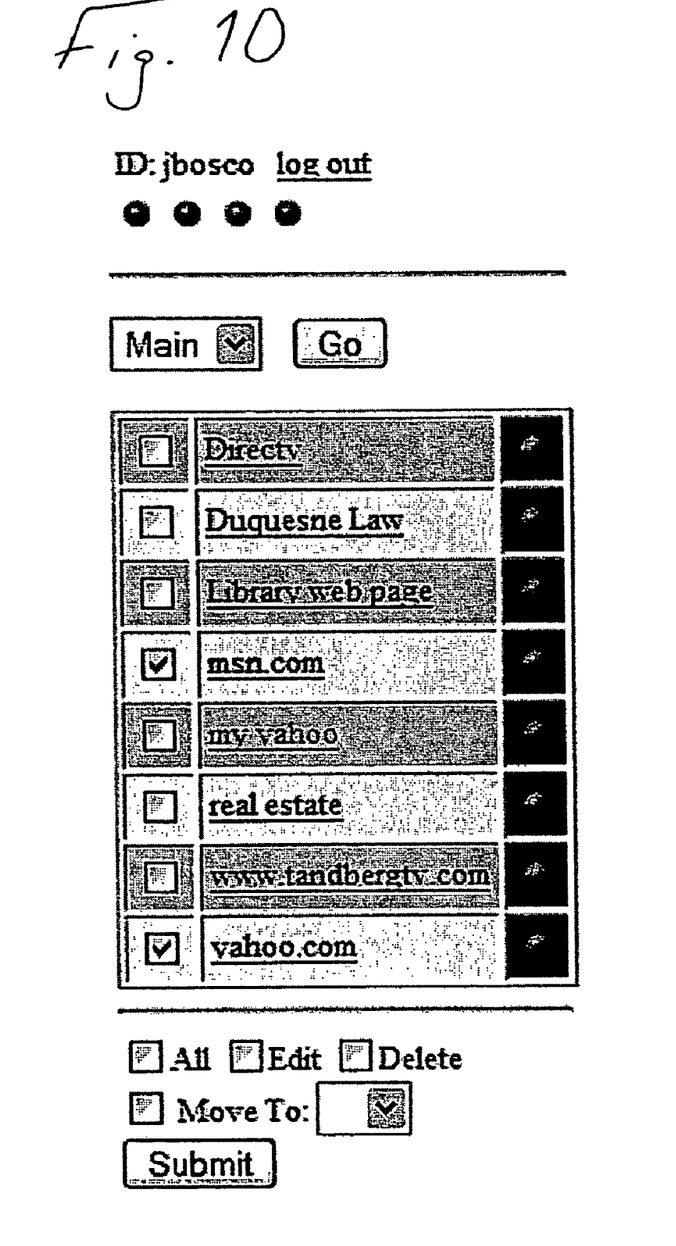
FIG. 10 provides a topographical view of a list of URLs.

To create a shaker list, first a list is created by the user as shown in FIG. 10. Then, a user selects URL links that they would like to comprise their list, the user could select MSN-.com and Yahoo.com. Next, in step 802 of FIG. 8, a string is created by combining MSN.com and Yahoo.com into one value and stored in a temporary variable. The variable is encrypted and saved into a new variable in step 804. In step 806, the database is called and the storage shaker list is set. Next, the hashing of the shaker list that took place in step 706 of FIG. 7 and the stored results are now retrieved from the storage database and compared in step 808 of FIG. 8 to the newly created temporary variable, which contains the hash digest of the entries that the user has selected during the active session. Since the user has selected MSN.com and Yahoo.com in this active session and the user had previously selected MSN.com and Yahoo.com in a previous session, the comparison of the hash digest for the previous session and the hash digest for the current session is positive and the user is now authenticated and allowed to operate freely within the cryptographic system.

Again, using the same scenario, this time the user chooses to enter a negative shaker list. With reference to FIG. 9, the user has been authorized to enter a list, the user sees a list of links on their screen as in FIG. 10, and the user chooses the links that compose the negative shaker list. In this case, the user chooses MSN.com and Yahoo.com in step 900. The user is then queried in step 902 and, in step 904, that this is a negative shaker list. In step 906, the user has selected the links and the cryptographic system retrieves the list of the links not selected by the user. In step 908, the retrieved links are combined into a list and hashed. The resulting digest is then stored into the database. At this point, the user exits the system and the session. Subsequently, the user decides to enter the system again, enters his password and is authorized to again enter data. The user sees a list, as in FIG. 10, of the data he has previously entered. After this, in order to gain full access to the system, the user must enter his negative shaker list. In order to do this, in step 800 of FIG. 8, the user clicks on all of the links other than MSN.com and Yahoo.com. In case there are many links, the system provides a box for "check all links" automatically. After all the boxes are checked, the user then unchecks MSN.com and Yahoo.com. In step 802, all of the links that are checked are then combined into a value and are combined in a temporary variable. In step 804, the temporary variable comprising a combination of all of the negative shaker list is then hashed and stored again into a temporary variable in volatile memory. Now the cryptographic system retrieves from the database a cipher text message, a hashed digest of the original negative shaker list of the user, and, in step 808, the two shaker lists are compared. In step 810, if the shaker lists match, then the user has been authenticated.

It will be readily appreciated by those skilled in the art that modifications may be made to the invention without departing from the concepts disclosed in the foregoing description. Accordingly, the particular embodiments described in detail herein are illustrative only and are not limiting to the scope of the invention, which is to be given the full breadth of the appended claims and any and all equivalents thereof.

The invention claimed is:

1. A cryptographic system comprising:
   an authenticator that determines if user credentials are validated to enter a specified account to view user data;
   an encryption module that operates on entered data using an entered password of the user credentials, to build a superkey to encrypt and decrypt data entered by a user;
   storage accessible from the authenticator that stores a user identification, an encrypted password, and the user data in encrypted form;
   volatile memory controlled by the authenticator configured to obtain and operate on data fields passed to it by the authenticator; and
   a user interface connected to the authenticator for receiving user input data in the form of a URL, a user name, a user identification, a password, an e-mail, a search result, a cell phone number, a credit card number, a personal identification number, a product key, a personal note, bank account data, a search results/link detail, diary/journal weblog data, a mailing address, a social security number, biometric data, a document, financial data, personal data, compiled data, summarized data, a communication, an attachment, internet data, history data, or any combination thereof,
   wherein the computer authenticates a user in the system upon successful comparison;
   a shaker list created by composing a list for the user based upon at least one user-selected field from at least one of a set of decrypted user data fields associated with the user's account, thereby defining at least one element of the shaker list, compiling the selected fields into an alpha-numeric string, and hashing the string,
   wherein the operations of the authenticator and the encryption module take place within the volatile memory.

* * * * *